(12) United States Patent
Kennedy et al.

(10) Patent No.: US 7,075,046 B2
(45) Date of Patent: Jul. 11, 2006

(54) OBJECTIVE LENS REFERENCE SYSTEM AND METHOD

(75) Inventors: Guy G. Kennedy, Underhill, VT (US); David M. Warshaw, S. Burlington, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 0 days.

(21) Appl. No.: 11/190,995

(22) Filed: Jul. 27, 2005

(65) Prior Publication Data

US 2006/0022114 A1 Feb. 2, 2006

Related U.S. Application Data

(60) Provisional application No. 60/591,911, filed on Jul. 28, 2004.

(51) Int. Cl.
G02B 27/64 (2006.01)
G02B 27/40 (2006.01)
G02B 7/04 (2006.01)

(52) U.S. Cl. ............... 250/201.2; 250/201.4; 359/383

(58) Field of Classification Search .. 250/201.2–201.4, 250/216, 226, 458.1, 459.1; 359/368, 383, 359/391, 393, 396–398; 356/402–425
See application file for complete search history.

(56) References Cited

U.S. PATENT DOCUMENTS

| 5,208,648 A | | 5/1993 | Batchelder et al. ......... 356/237 |
| 5,483,079 A | * | 1/1996 | Yonezawa ............... 250/559.29 |
| 5,532,874 A | | 7/1996 | Stein ........................... 359/394 |
| 5,604,344 A | * | 2/1997 | Finarov .................... 250/201.3 |
| 5,714,749 A | * | 2/1998 | Yonezawa et al. ........ 250/201.2 |
| 5,719,700 A | | 2/1998 | Corcuff et al. .............. 359/368 |
| 5,939,709 A | | 8/1999 | Ghislain et al. ............ 250/216 |
| 6,310,687 B1 | | 10/2001 | Stumbo et al. ............. 356/317 |
| 6,449,087 B1 | | 9/2002 | Ogino ........................ 359/383 |
| 6,597,499 B1 | | 7/2003 | Kawano et al. ............. 359/387 |
| 6,621,082 B1 | | 9/2003 | Morita et al. ............... 250/310 |
| 6,649,893 B1 | | 11/2003 | Fujimoto et al. ........ 250/201.2 |
| 6,682,927 B1 | | 1/2004 | Meyer et al. ............ 435/288.7 |
| 2004/0037175 A1 | | 2/2004 | Clark et al. .............. 369/44.23 |

OTHER PUBLICATIONS

*Axsys Technologies, Lasertrac AutoFocus*, Axsys—Imaging Systems, Jan. 2004.
*Visualizing Single Molecules Inside Living Cells Using Total Internal Reflection Fluorescence Microscopy*, G.I. Mashanov, D. Tacon, A.E. Knight, M. Peckham, and Justin E. Molloy; Science Direct, Method 29 (2003) pp. 142-152.
"The Spatial and Temporal Dynamics of Pleckstrin Homology Domain Binding at the Plasma Membrane Measured by Imaging Single Molecules in Live Mouse Myoblasts", Gregory I. Mashanov, Daryl Tacon, Michelle Peckham, and Justin E. Molloy; *The Journal of Biological Chemistry*, vol. 279, No. 15, Issue of Apr. 9, 2004; pp. 15274-15280.

* cited by examiner

*Primary Examiner*—Stephone B. Allen
*Assistant Examiner*—Patrick J. Lee
(74) *Attorney, Agent, or Firm*—Downs Rachlin Martin PLLC

(57) ABSTRACT

A system and method for referencing an objective lens to a desired plane of focus. In one embodiment, a dichroic element is utilized to reflect energy of one or more wavelengths that has passed through an objective lens to a detector for determining a position of the objective lens to a desired plane of focus. The objective lens may be manually and/or automatically focused to the desired plane of focus.

26 Claims, 11 Drawing Sheets ously analyzes the image. To do this, an image from the camera is captured by the computer and analyzed. This provides a control signal that drives the motorized focusing system in a repeating cycle until the proper focus is obtained. This works well to initially get a sample focused. At this point any refocusing must be initiated by a command. While it is refocusing, the camera is dedicated to the focusing process, itself. Unfortunately, this process is slow and precludes image acquisition during the automated focusing.

OBJECTIVE LENS REFERENCE SYSTEM AND METHOD

RELATED APPLICATION DATA

This application claims the benefit of U.S. Provisional Patent Application No. 60/591,911, filed Jul. 28, 2004, entitled "Focus Feedback System and Method Using Reflected Laser Light as a Signal Source," which is incorporated herein by reference in its entirety.

FIELD OF THE INVENTION

The present invention generally relates to the field of microscopy. In particular, the present invention is directed to a system and method for referencing a position of an objective lens.

BACKGROUND OF THE INVENTION

In microscopy referencing the image plane of an objective lens to a desired plane with respect to the sample can be difficult. This difficulty may be due to variations over time in the distance between the objective lens and the sample holder. Causes of such variations include changes to the sample stage, variations in sample slides, changes in position of the objective lens, thermo mechanical fluctuations, and any combinations thereof. Knowing the position of the objective lens with respect to a sample holder is valuable for focusing the objective lens.

Typical focusing methods are derived from image analysis through human or software interpretation. In traditional light microscopy, the user manually adjusts the mechanical focus mechanism while simultaneously looking into an eyepiece for an image to appear. As this image comes into focus, the user fine tunes the focus to obtain the clearest image. This is the most rudimentary form of feedback. As camera sensitivity has improved, imaging lower light levels has become possible, for example in fluorescence microscopy single fluorophore imaging is now attainable.

With these high sensitivity imaging systems, there are two basic methods of focusing. A first method requires a user to adjust the focus manually while viewing the image on a video monitor. Although this method works, it requires skill and experience, particularly when initially finding the focus point. In high magnification systems the depth of field is small so that maintaining the focus is difficult given that any "X-Y" movement of the stage will usually require refocusing given that there will be slight movement of the sample in the "Z" axis. In addition, stage drift due to thermal fluctuations is another common source of mechanical drift.

Another method requires a user to employ digital image based software to drive an auto focusing mechanism. Image analysis is used to determine focus by measuring contrast of an acquired digital image. This requires that the system have a motorized focus driven from a computer that simultaneously analyzes the image. To do this, an image from the camera is captured by the computer and analyzed. This provides a control signal that drives the motorized focusing system in a repeating cycle until the proper focus is obtained. This works well to initially get a sample focused. At this point any refocusing must be initiated by a command. While it is refocusing, the camera is dedicated to the focusing process, itself. Unfortunately, this process is slow and precludes image acquisition during the automated focusing.

A reliable way to reference an objective lens image plane to a sample without using an image of the sample in the image plane is needed.

SUMMARY OF THE INVENTION

In one embodiment, the present invention provides a system for referencing an objective lens to a desired plane of focus. The system includes an objective lens having a center axis. The system also includes an energy source for directing a first energy of a first wavelength so as to intercept the objective lens at a first location that is radially spaced at a second distance from the center axis. The first energy is directed by the objective lens to a first surface of a dichroic element positioned a predetermined first distance from the desired plane of focus. The first energy then reflects off the first surface and transmits through the objective lens at a second location that is different from the first location at a third distance from the center axis. The system also includes a detector operatively configured to detect the first energy after being transmitted through the objective lens at the second location, the detector providing information relating to the second distance relative to the first distance.

In another embodiment, the present invention provides a system for referencing an objective lens to a desired plane of focus. The system includes an objective lens having a center axis. The system also includes a dichroic element positioned a predetermined first distance from the desired plane of focus. Further, the system includes an energy source for directing a first energy of a first wavelength so as to intercept the objective lens at a first location that is radially spaced at a second distance from the center axis, the first energy being directed by the objective lens to a first surface of the dichroic element, the first energy then reflecting off the first surface and transmitting through the objective lens at a second location that is different from the first location at a third distance from the center axis. Still further, the system includes a detector operatively configured to detect the first energy after being transmitted through the objective lens at the second location, the detector providing information relating to the second distance relative to the first distance.

In yet another embodiment, the present invention provides a method of focusing an imaging device. The method includes (a) providing a dichroic element having a first side and a second side; (b) providing an objective lens having a center axis, a first side, and a second side spaced from the first side, wherein the first side of the objective lens confronts the first side of the dichroic element; (c) passing a first energy through the objective lens at a first distance from the center axis such that the first energy reflects off of the dichroic element and back through the objective lens at a second distance from the center axis; (d) detecting a relationship between the first distance and the second distance; and (e) using the relationship to focus the objective lens.

In still yet another embodiment, the present invention provides a system for referencing an objective lens to a desired plane of focus. The system includes an objective lens having a center axis. The system also includes a dichroic element positioned a predetermined first distance from the desired plane of focus. Further, the system includes an energy source for directing a first energy of a first wavelength so as to intercept the objective lens at a first location that is radially spaced at a second distance from the center axis, the first energy being directed by the objective lens to a first surface of the dichroic element. Still further, the system includes a detector operatively configured to detect a relative position of the first energy that is reflected from the first surface as a second distance between the objective lens and the dichroic element is varied and provide information related to the relative position for referencing the objective lens to the desired plane of focus.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE DRAWINGS

The present invention provides a system and method for referencing an objective lens to a desired plane of focus. In one embodiment, the system includes a source of energy for providing an energy to an objective lens. The energy passes through the objective lens and is reflected off of a dichroic element that is positioned at a known distance from a desired plane of focus. The reflected energy is detected by a detector element. When the objective lens is at a distance from the dichroic element that would focus the objective lens at the plane of the dichroic element (that is, the image plane of the objective lens is positioned at the plane of the dichroic element), the reflected energy will be incident at the detector element at a first location. Using measured deviations from this first location (or another known location representing another condition of the objective lens) and the known distance between the dichroic element and the desired plane of focus, the objective lens can be referenced to the desired plane of focus. This reference can allow the objective lens to be focused on the desired plane of focus either manually or automatically.

Figure 1:
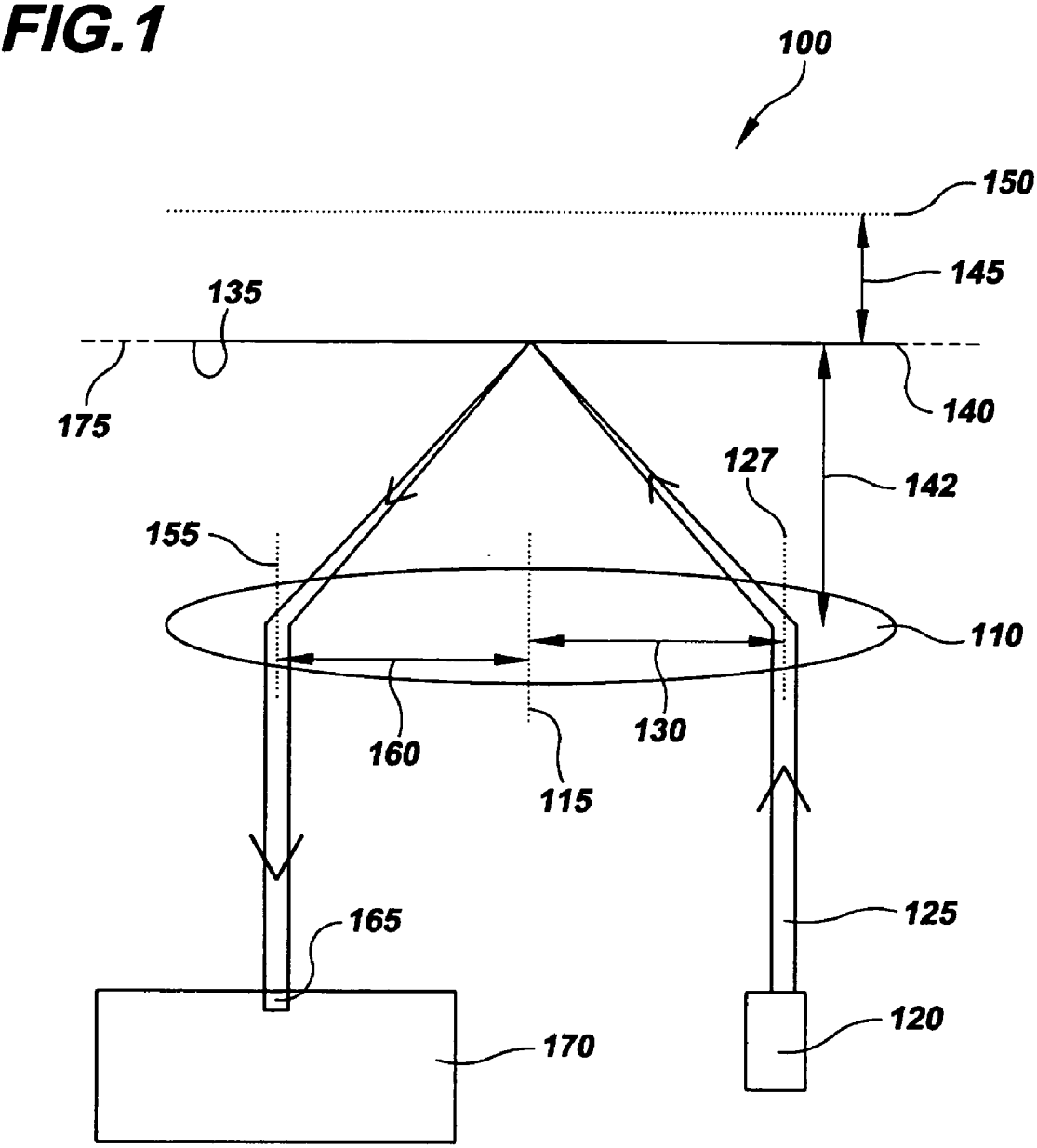
FIG. 1 shows a schematic drawing of one example of a system according to the present invention.

FIG. 1 illustrates an exemplary embodiment of the present invention. An exemplary system 100 includes an objective lens 110 having a center axis 115. An energy source 120 is configured to deliver an energy 125 to a first location 127 of objective lens 110 that is radially spaced from center axis 115 at a first distance 130. In one example, energy 125 may include an energy of a first wavelength used for referencing. In another example, energy 125 may also include an energy of a second wavelength used for imaging a sample. Energy 125 transmits through objective lens 110 and reflects from a first surface 135 of a dichroic element 140. Objective lens 110 is shown spaced a distance 142 from first surface 135. Dichroic element 140 is positioned at a known distance 145 from a desired plane of focus 150. The energy 125 reflected from surface 135 passes back through objective lens 110 at a second location 155 that is radially spaced from center axis 115 at a second distance 160. Energy 125 that passes through objective lens 110 at second location 155 is incident at a position 165 of a detector 170. FIG. 1 shows system 100 with objective lens 110 in focus to first surface 135 of dichroic element 140. An image plane 175 of objective lens 110 is coincident with first surface 135 in FIG. 1. Image plane 175 is a fixed distance from objective lens 110. This distance depends on the objective lens used. As distance 142 is shortened, image plane 175 will move up with respect to first surface 135. As distance 142 is increased, image plane 175 will move down with respect to first surface 135.

Knowing where on detector 170 that energy 125 will be incident at focus to first surface 135 (or some other condition other than focus) can be combined with known distance 145 to reference objective lens 110 to desired plane of focus 150 (e.g. for focusing objective lens 110 at desired plane of focus 150). When objective lens 110 is in focus to first surface 135, first distance 130 and second distance 160 are the same. The relationship of first distance 130 and second distance 160 can be indicated by the position of incidence of energy 125 at detector 170. The location of position 165 on detector 170 is related to the relative position of objective lens 110 with respect to dichroic element 140 and, thus, is related to second distance 160 relative to first distance 130.

A variety of objective lenses are known and are used in a number of imaging applications, any of which may be used as objective lens 110. Example imaging applications include, but are not limited to, simple brightfield microscopy, Epi—fluorescence microscopy, total internal reflection (TIR) microscopy, confocal microscopy, a water immersion objective application, and darkfield microscopy. Numerical aperture (NA) of an objective lens can vary and may depend on the particular imaging application. For example, in TIR microscopy, high NA (e.g., 1.35 and above) objective lenses provide an ability to deliver an excitation beam to a glass-sample interface at the required critical angle. In one example, an objective lens, such as objective lens 110, may include a single objective lens. In another example, an objective lens, such as objective lens 110, may include a plurality of objective lenses configured to work together. The image plane of an objective lens is a fixed distance from the objective lens. The fixed distance depends on the characteristics of the particular objective lens. A desired plane of focus is where the image plane must be to image entities within the desired plane of interest.

A dichroic element, such as dichroic element 140, may include any material that reflects an energy of a first wavelength and allows to be transmitted therethrough an energy of a second wavelength. Example materials for a dichroic element include, but are not limited to, beryllium oxide, magnesium oxide, magnesium fluoride, and any combinations thereof. It is possible to use the energy of the first wavelength to reference the position of the objective lens according to the present invention and to use the energy of the second wavelength as an imaging energy for imaging a sample. In another example, a sample slide may be made up of (in whole or in part) a dichroic material. In yet another example, a sample slide may include a dichroic element on a side of the slide proximate a sample to be imaged. In still yet another example, a sample slide may include a dichroic element on a side of the slide opposite a sample side and closest to an objective lens. A dichroic element that is on a side of a sample slide may be a layered material. In another example, the dichroic element may be a thin film on a side of a sample slide. In a further example, a dichroic element may be any surface mechanically reference to a sample. In still a further example, a dichroic element may be a sample surface of an imaging device. In an additional example, a vacuum coated mineral on glass creates a mirror like lens which reflects certain wavelengths of light while transmitting other wavelengths of light.

An energy source, such as energy source 120, may include any energy source that generates an energy (electromagnetic radiation) that can reflect from a surface of a dichroic element according to the present invention. Example energy sources include, but are not limited to, a laser, an arc lamp, a tungsten lamp, a halogen lamp, a light emitting diode, a fluorescent source, other light sources, and any combinations thereof. Example energy used for referencing an objective lens, such as objective lens 110, to a desired plane of focus, such as desired plane of focus 150, includes, but is not limited to, visible, infrared, ultraviolet, near infared and any combinations thereof. In one example, the energy is collimated upon entering the objective lens. In another example, the energy is light (e.g., laser light). In another example, an energy source may provide energy that includes energy of a first wavelength that will reflect from a chosen dichroic element and energy of a second wavelength that will pass through the chosen dichroic element. One example application in which this may be useful is TIR microscopy, where the energy of the second wavelength may be used as an excitation energy for TIR. Energy of the second wavelength may also be used as an imaging energy.

A detector, such as detector 170, may be any detector that detects the reflected energy 125 and can determine a relative position of the reflected energy with respect to a known position of an objective lens, such as objective lens 110, in relation to a dichroic element, such as dichroic element 140. In one example, a detector element detects a relative position of the reflected energy as it exits the objective lens with respect to the position of the incoming energy as it enters the objective lens. Examples of suitable detectors include, but are not limited to, linear detectors, quadrant detectors, photo multipliers, and imaging arrays. The information gained by the detector regarding the relative position of the reflected energy beam can be used to reposition the objective lens with respect to a desired plane of focus. It is possible that this repositioning can be done manually or automatically. A repositioning element can be employed to reposition the objective lens, or to reposition the sample in relation to the lens. An optional control element may be used to interpret the information from the detector and deliver repositioning information to the repositioning element. Many configurations of transferring the information obtained from the detector element to the actual repositioning of the objective lens will be apparent to one of ordinary skill in the art. In one example, a user may visually interpret the information from a linear detector and manually reposition the objective lens until the linear detector indicates a condition of focus of the objective lens on a desired plane of focus. In another example, the detector can deliver position information to a control processor that would drive a servo-mechanical element for repositioning the objective lens and/or the desired plane of focus (e.g. repositioning the sample stage with respect to the objective lens).

Figure 2:
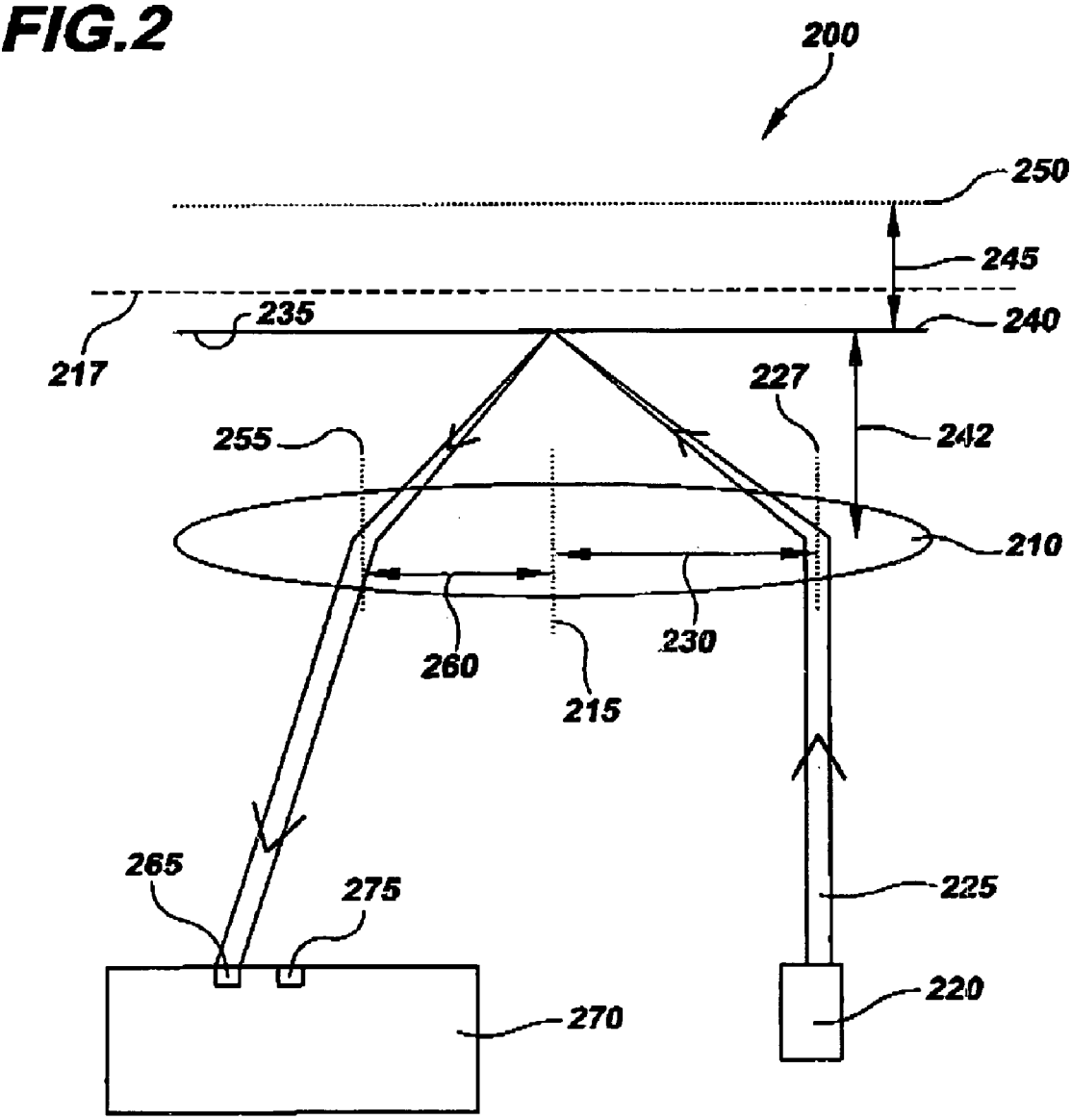
FIG. 2 shows a schematic drawing of another example of a system according to the present invention.

FIG. 2 illustrates an exemplary system 200 according to the present invention. System 200 includes an objective lens 210 having a center axis 215 and an image plane 217. An energy source 220 is configured to deliver an energy 225 to a first location 227 of objective lens 210 that is radially spaced from center axis 215 at a first distance 230. Energy 225 transmits through objective lens 210 and reflects from a first surface 235 of a dichroic element 240. Objective lens 210 is shown spaced a distance 242 from first surface 235. Dichroic element 240 is positioned at a known distance 245 from a desired plane of focus 250. The energy 225 reflected from surface 235 passes back through objective lens 210 at a second location 255 that is radially spaced from center axis 215 at a second distance 260. Energy 225 that passes through objective lens 210 at second location 255 is incident at a position 265 of a detector 270. Position 265 is displaced from a position 275 at which energy 225 would have been incident if objective lens 210 were in focus to first surface 235 of dichroic element 240. Information about this displacement can be used to determine the position of objective lens 210 with respect to first surface 235 and, thus, can be used to reference objective lens 210 to desired plane of focus 250 (e.g. for focusing). FIG. 2 shows system 200 with objective lens 210 above focus to first surface 235 of dichroic element 240.

Figure 3:
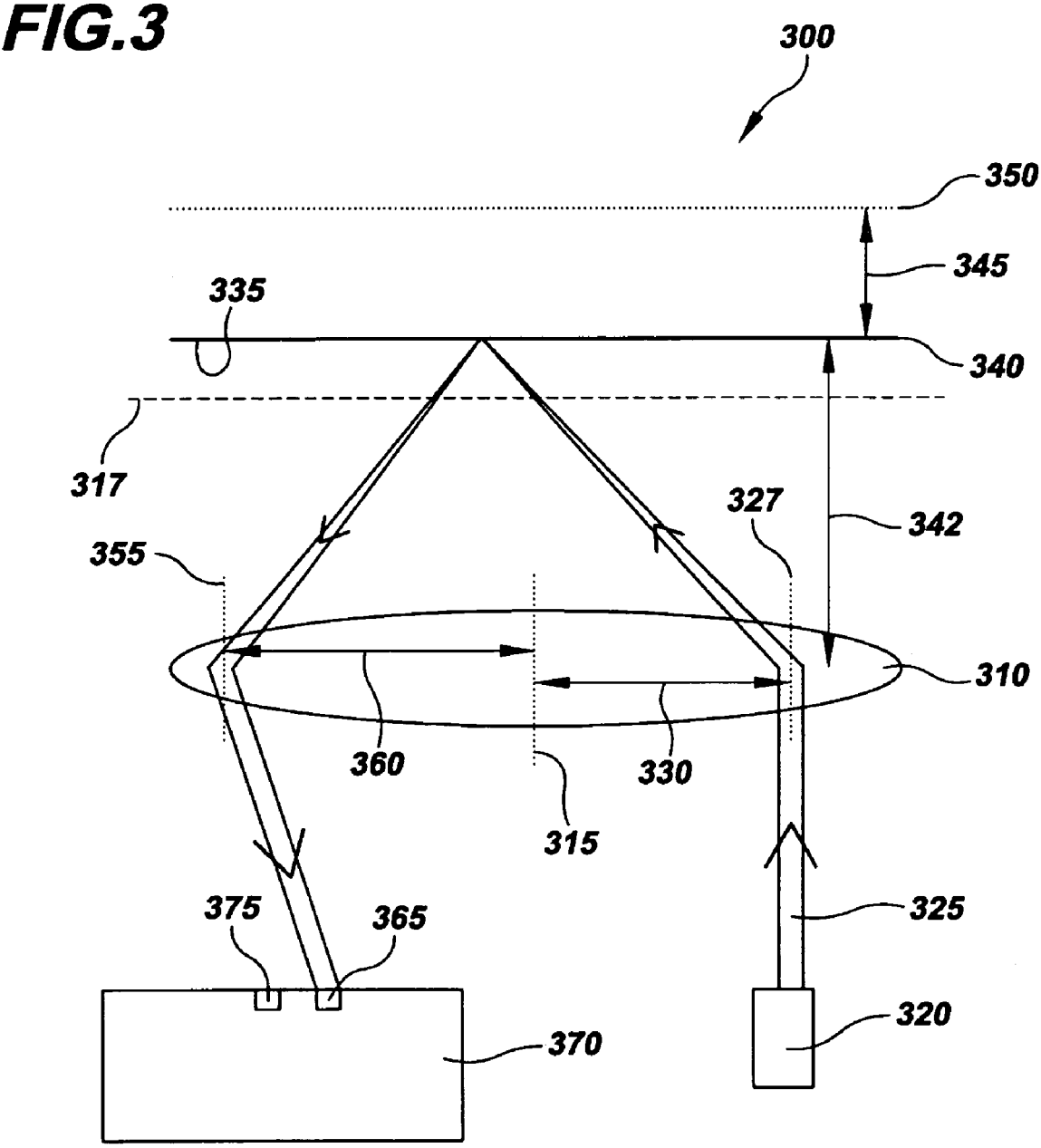
FIG. 3 shows a schematic drawing of yet another example of a system according to the present invention.

FIG. 3 illustrates another exemplary system 300 according to the present invention. System 300 includes an objective lens 310 having a center axis 315 and an image plane 317. An energy source 320 is configured to deliver an energy 325 to a first location 327 of objective lens 310 that is radially spaced from center axis 315 at a first distance 330. Energy 325 transmits through objective lens 310 and reflects from a first surface 335 of a dichroic element 340. Objective lens 310 is shown spaced a distance 342 from first surface 335. Dichroic element 340 is positioned at a known distance 345 from a desired plane of focus 350. The energy 325 reflected from surface 335 passes back through objective lens 310 at a second location 355 that is radially spaced from center axis 315 at a second distance 360. Energy 325 that passes through objective lens 310 at second location 355 is incident at a position 365 of a detector 370. Position 365 is displaced from a position 375 at which energy 325 would have been incident if objective lens 310 were in focus to first surface 335 of dichroic element 340. Information about this displacement can be used to determine the position of objective lens 310 with respect to first surface 335 and, thus, can be used to reference objective lens 310 to desired plane of focus 350 (e.g. for focusing). FIG. 3 shows system 300 with objective lens 310 below focus to first surface 335 of dichroic element 340.

Figure 4:
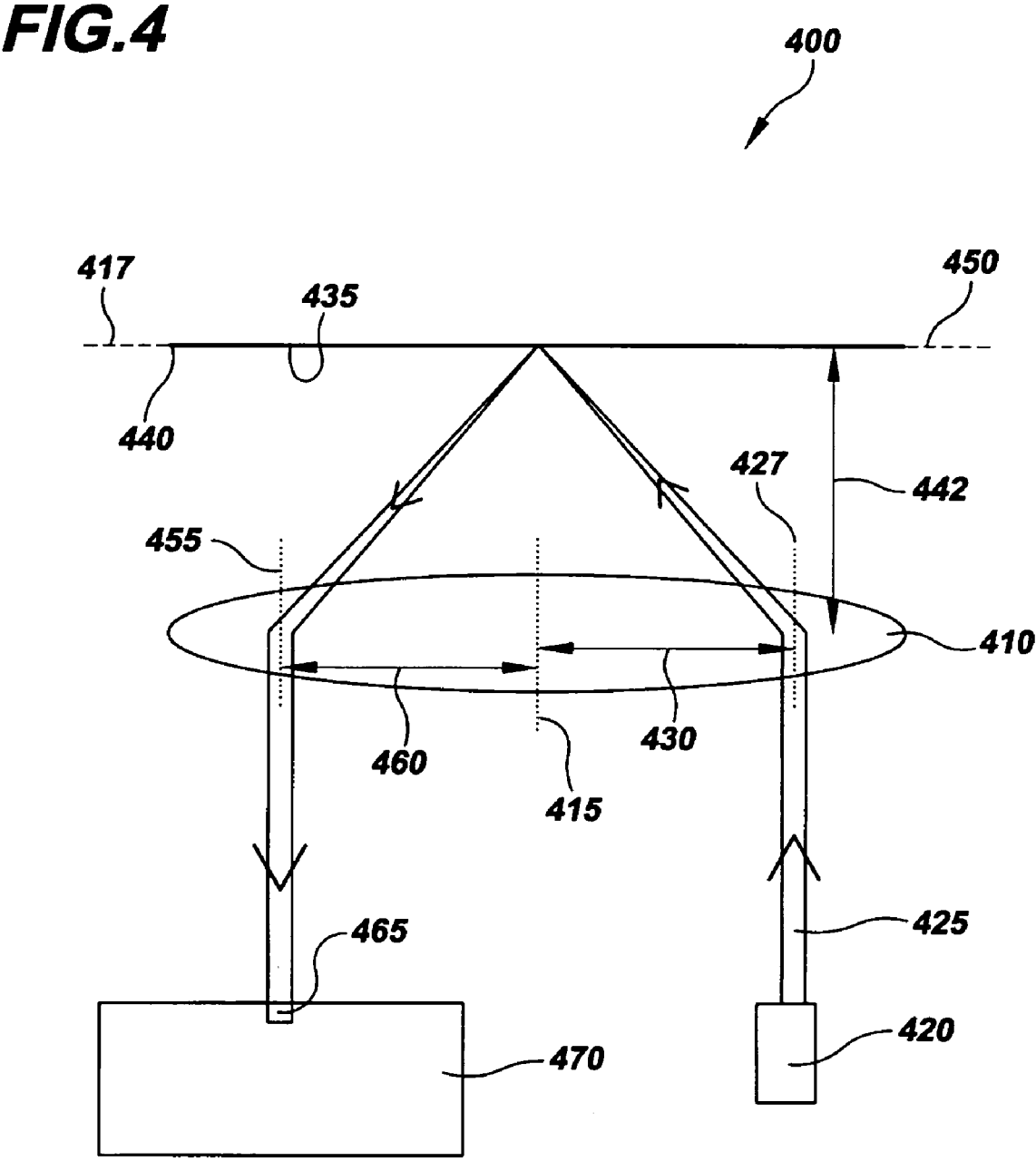
FIG. 4 shows a schematic drawing of still another example of a system according to the present invention.

FIG. 4 illustrates another exemplary system 400 according to the present invention. System 400 includes an objective lens 410 having a center axis 415 and an image plane 417. An energy source 420 is configured to deliver an energy 425 to a first location 427 of objective lens 410 that is radially spaced from center axis 415 at a first distance 430. Energy 425 transmits through objective lens 410 and reflects from a first surface 435 of a dichroic element 440. Objective lens 410 is shown spaced a distance 442 from first surface 435. First surface 435 of dichroic element 440 is positioned coincident with a desired plane of focus 450 and image plane 417. In this example, The energy 425 reflected from surface 435 passes back through objective lens 410 at a second location 455 that is radially spaced from center axis 415 at a second distance 460. Energy 425 that passes through objective lens 410 at second location 455 is incident at a position 465 of a detector 470. FIG. 4 shows system 400 with objective lens 410 in focus to first surface 435 of dichroic element 440 and desired plane of focus 450.

A controller may be utilized to process information from a detector, such as detector 470. In one example, information processed by a controller may be used to automatically change the position of an objective lens relative to a desired plane of focus. Changing the relative position may occur in a variety of ways. Examples of ways to change the relative position of an objective lens with respect to a desired plane of focus include, but are not limited to, moving the objective lens; moving the desired plane of focus, such as by moving a sample stage; moving the sample holder; and any combinations thereof. In another example, information processed by a controller may be used to display information related to the relative distance of incoming energy and reflected energy from the center of the objective lens. A controller may include or be in communication with a memory for storing information obtained from a detector, directions for processing information, known or programmed distance between a dichroic element and a desired plane of focus, system calibration information, and/or other information.

Figure 5:
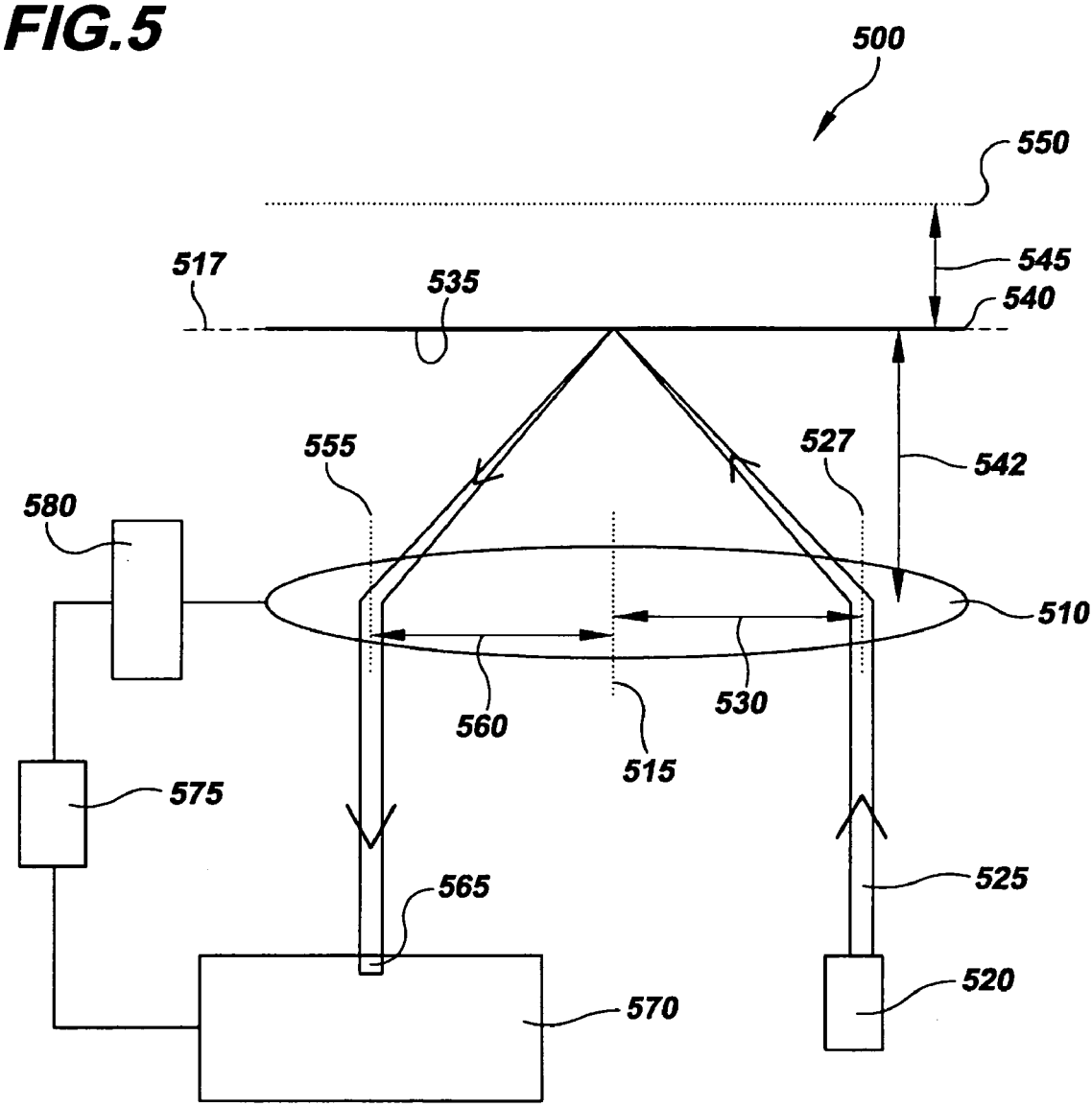
FIG. 5 shows a schematic drawing of still yet another example of a system according to the present invention.

FIG. 5 illustrates yet another exemplary system 500 according to the present invention. System 500 includes an objective lens 510 having a center axis 515 and image plane 517. An energy source 520 is configured to deliver an energy 525 to a first location 527 of objective lens 510 that is radially spaced from center axis 515 at a first distance 530. Energy 525 transmits through objective lens 510 and reflects from a first surface 535 of a dichroic element 540. Objective lens 510 is shown spaced a distance 542 from first surface 535. Dichroic element 540 is positioned at a known distance 545 from a desired plane of focus 550. The energy 525 reflected from surface 535 passes back through objective lens 510 at a second location 555 that is radially spaced from center axis 515 at a second distance 560. Energy 525 that passes through objective lens 510 at second location 555 is incident at a position 565 of a detector 570. Detector 570 is in communication with a controller 575. Controller 575 may process information reflecting first distance 530 relative to second distance 560 to determine the position of objective lens 510 with respect to dichroic element 540. The location of position 565 on detector 570 is related to the relative position of objective lens 510 with respect to dichroic element 540 and, thus, is related to second distance 560 relative to first distance 530. Controller 575 is in communication with a position modification device 580 that is in mechanical communication with objective lens 510 for changing a position of objective lens 510. Controller 575 may then utilize the position information with known distance 545 to direct position modification device 580 to modify the position of objective lens 510. Example position modification devices according to the present invention include, but are not limited to, a servo-mechanical feedback element. In another example, position modification device 580 may be in mechanical communication with a device, such as a sample stage, for changing a position of desired plane of focus 550 with respect to objective lens 510.

Figure 6:
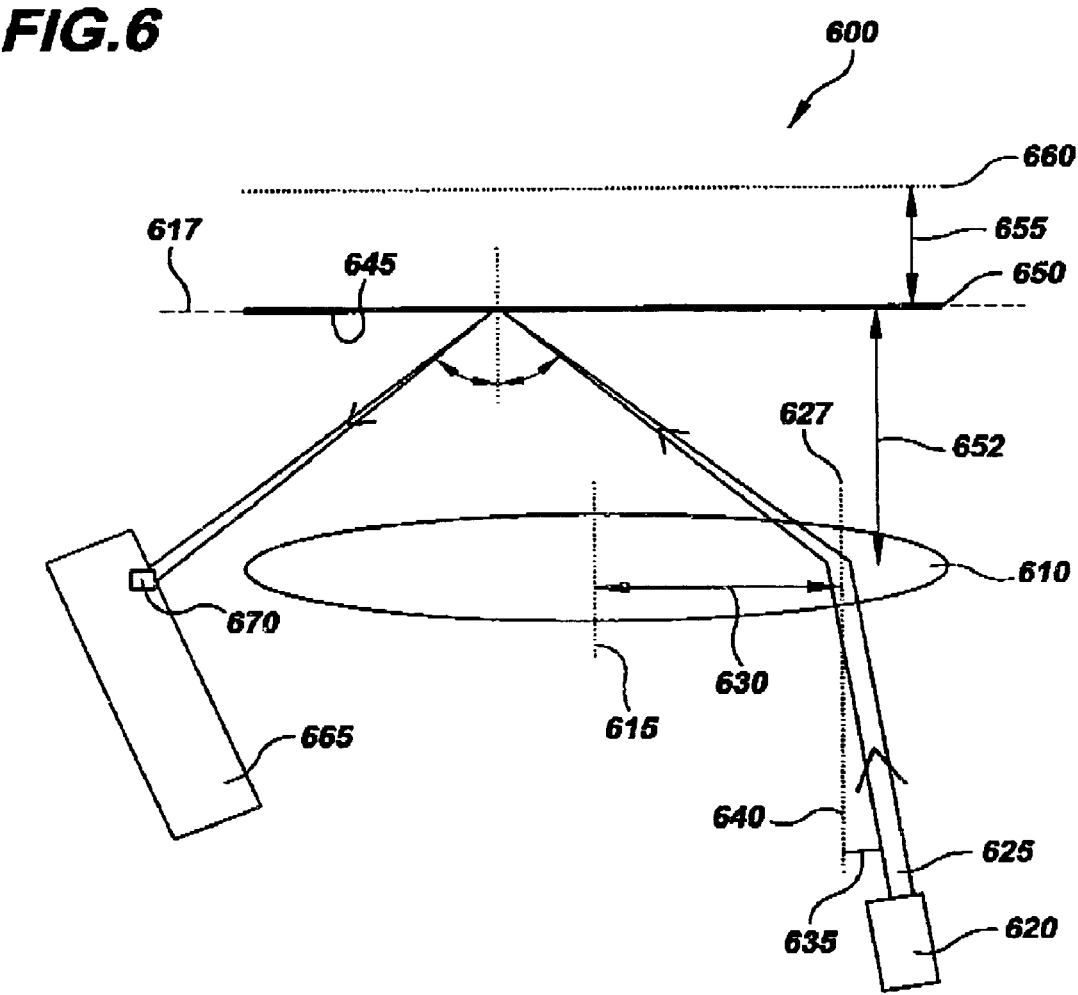
FIG. 6 shows a schematic drawing of a further example of a system according to the present invention.

FIG. 6 illustrates another exemplary embodiment of the present invention. System 600 includes an objective lens 610 having a center axis 615 and image plane 617. An energy source 620 is configured to deliver an energy 625 to a first location 627 of objective lens 610 that is radially spaced from center axis 615 at a first distance 630. In this embodiment, energy 625 is incident at objective lens 610 at an angle 635 to a line 640 that is normal to objective lens 610. Energy 625 transmits through objective lens 610 and reflects from a first surface 645 of a dichroic element 650. Objective lens 610 is shown spaced a distance 652 from first surface 645. Dichroic element 650 is positioned at a known distance 655 from a desired plane of focus 660. Angle 635 is such that reflected energy 625 does not pass back through objective lens 610. Instead, energy source 620 is configured to deliver energy 625 at angle 635 so that reflected energy 625 will pass to a detector 665. Reflected energy 625 is incident at a position 670 at detector 665. Detector 665 may be calibrated to determine a known location of objective lens 610 with respect to dichroic element 650. Using this known location, information about the position of position 670, and known distance 655, objective lens 610 can be referenced to desired plane of focus 660.

Figure 7:
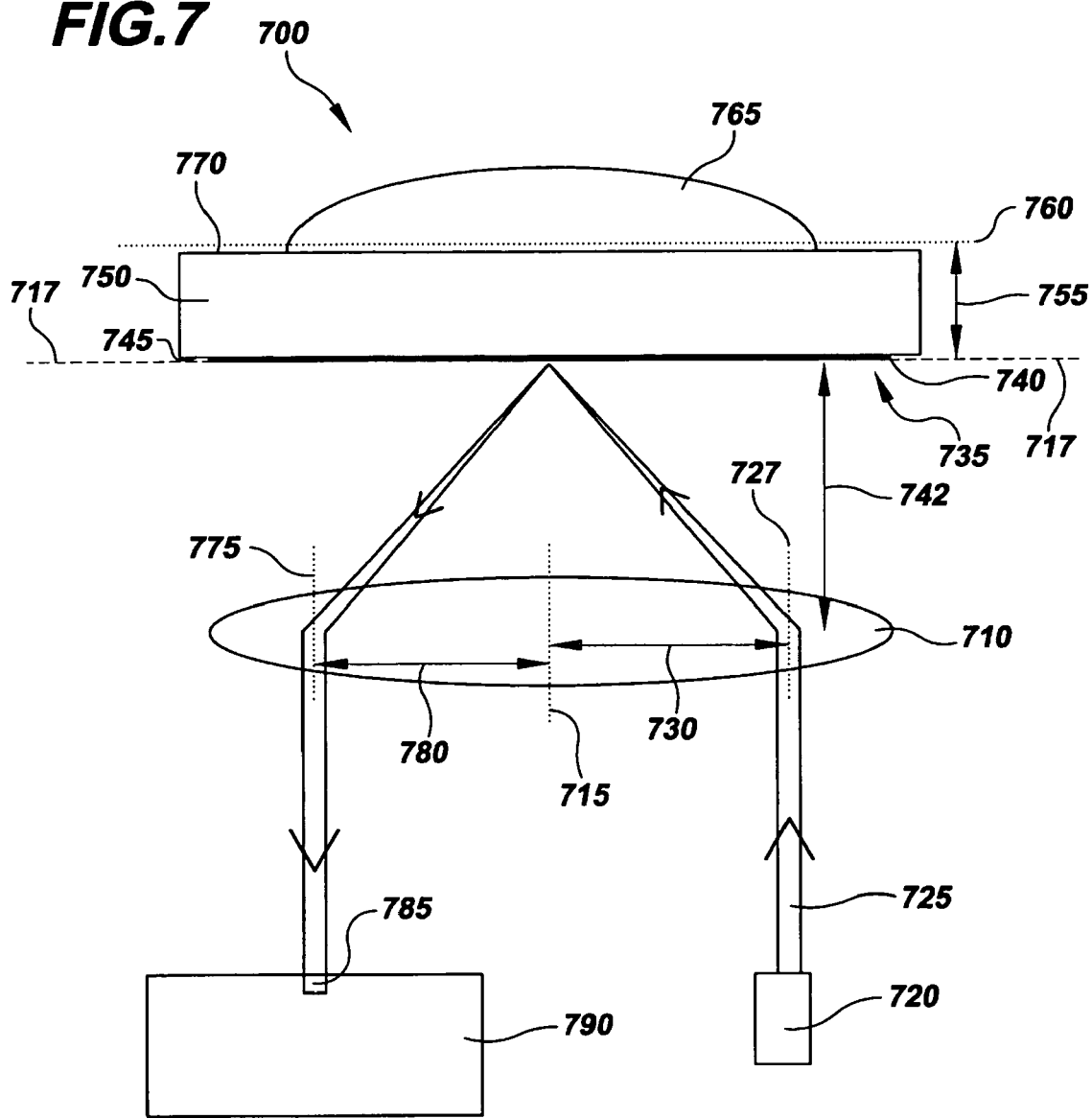
FIG. 7 shows a schematic drawing of yet a further example of a system according to the present invention.

As discussed above, in one example, a sample slide may include a dichroic material or, in another example, may have one or more dichroic layers on a surface of the sample slide. FIG. 7 illustrates one exemplary embodiment of the present invention. An exemplary system 700 includes an objective lens 710 having a center axis 715 and image plane 717. An energy source 720 is configured to deliver an energy 725 to a first location 727 of objective lens 710 that is radially spaced from center axis 715 at a first distance 730. Energy 725 transmits through objective lens 710 and reflects from a first surface 735 of a dichroic element 740. Objective lens 710 is shown spaced a distance 742 from first surface 735. Dichroic element 740 includes one or more layers on a surface 745 of a sample slide 750. Dichroic element 740 is positioned at a known distance 755 from a desired plane of focus 760. Desired plane of focus 760 transects a sample 765 positioned on a second surface 770 of sample slide 750. The energy 725 reflected from surface 735 passes back through objective lens 710 at a second location 775 that is radially spaced from center axis 715 at a second distance 780. Energy 725 that passes through objective lens 710 at second location 775 is incident at a position 785 of a detector 790. FIG. 7 shows system 700 with objective lens 710 in focus to first surface 735 of dichroic element 740. Information from detector 790 may be used to reference objective lens 710 to desired plane of focus 760.

Figure 8:
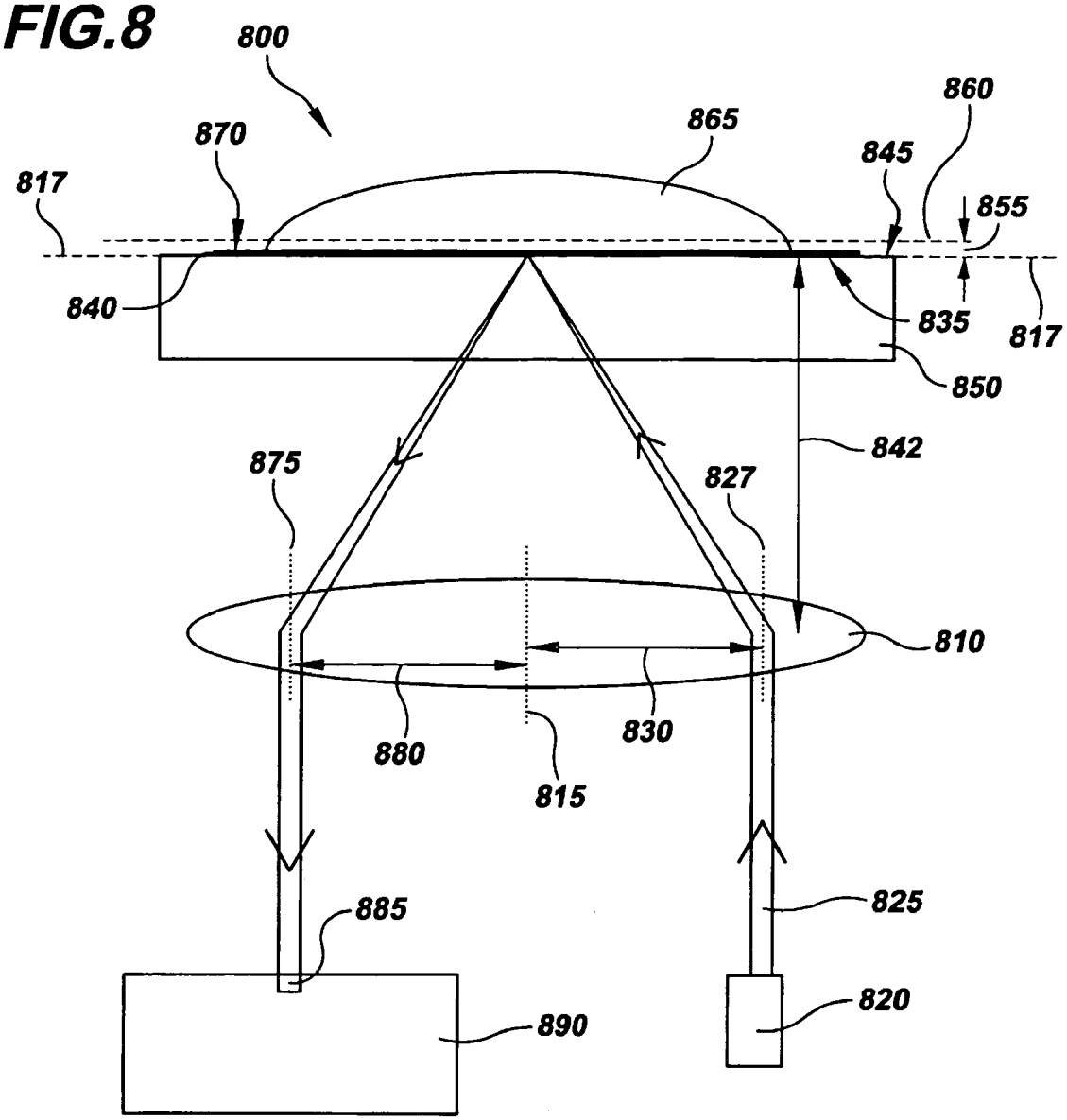
FIG. 8 shows a schematic drawing of still a further example of a system according to the present invention.

FIG. 8 illustrates still another exemplary embodiment of the present invention. An exemplary system 800 includes an objective lens 810 having a center axis 815 and image plane 817. An energy source 820 is configured to deliver an energy 825 to a first location 827 of objective lens 810 that is radially spaced from center axis 815 at a first distance 830. Energy 825 transmits through objective lens 810 and reflects from a first surface 835 of a dichroic element 840. Objective lens 810 is shown spaced a distance 842 from first surface 835. Dichroic element 840 includes one or more layers on a first surface 845 of a sample slide 850. Dichroic element 840 is positioned at a known distance 855 from a desired plane of focus 860. Desired plane of focus 860 transects a sample 865 positioned on a second surface 870 of dichroic element 840 that is opposite sample slide 850. The energy 825 reflected from surface 835 passes back through objective lens 810 at a second location 875 that is radially spaced from center axis 815 at a second distance 880. Energy 825 that passes through objective lens 810 at second location 875 is incident at a position 885 of a detector 890. FIG. 8 shows system 800 with objective lens 810 in focus to first surface 835 of dichroic element 840. Information from detector 890 may be used to reference objective lens 810 to desired plane of focus 860.

Figure 9:
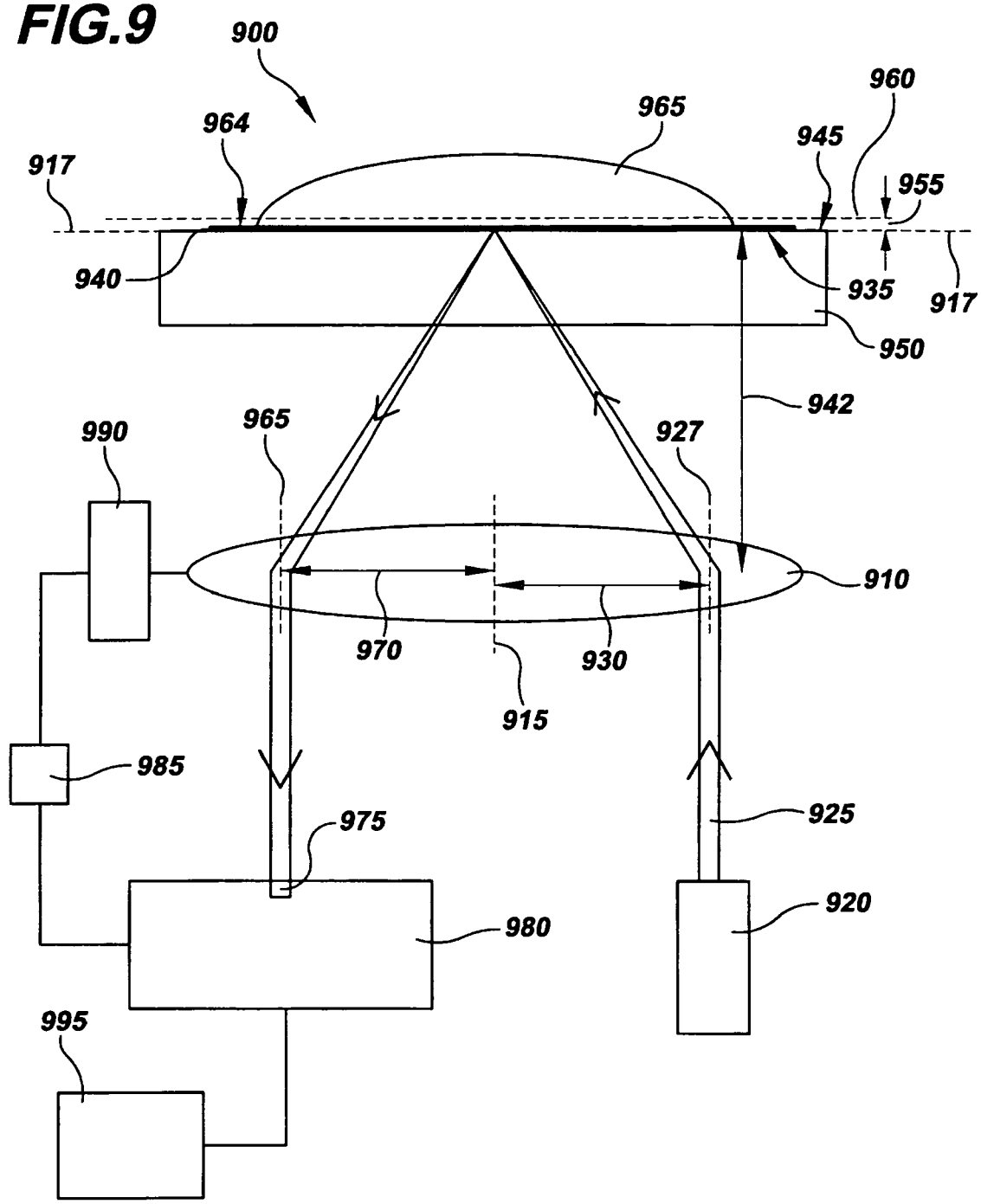
FIG. 9 shows a schematic drawing of still yet a further example of a system according to the present invention.

FIG. 9 illustrates yet another exemplary system 900 according to the present invention. System 900 includes an objective lens 910 having a center axis 915 and image plane 917. An energy source 920 is configured to deliver an energy 925 to a first location 927 of objective lens 910 that is radially spaced from center axis 915 at a first distance 930.

Energy 925 transmits through objective lens 910 and reflects from a first surface 935 of a dichroic element 940. Objective lens 910 is shown spaced a distance 942 from first surface 935. Dichroic element 940 is positioned on a first surface 945 of a sample slide 950. Dichroic element 940 is positioned at a known distance 955 from a desired plane of focus 960. Desired plane of focus 960 transects a sample 962 positioned on a second surface 964 of dichroic element 940 that is opposite sample slide 950. The energy 925 reflected from surface 935 passes back through objective lens 910 at a second location 965 that is radially spaced from center axis 915 at a second distance 970. Energy 925 that passes through objective lens 910 at second location 965 is incident at a position 975 of a detector 980. The location of position 975 on detector 980 is related to the relative position of objective lens 910 with respect to dichroic element 940 and, thus, is related to second distance 970 relative to first distance 930. Detector 980 is in communication with a controller 985. Controller 985 may process information reflecting first distance 930 relative to second distance 970 to determine the position of objective lens 910 with respect to dichroic element 940. Controller 985 is in communication with a position modification device 990 that is in mechanical communication with objective lens 910 for changing a position of objective lens 910. Controller 985 may then utilize the position information with known distance 955 to direct position modification device 990 to modify the position of objective lens 910. System 900 may also include an optional visual indicator 995, shown here in direct communication with detector 980. Visual indicator 995 may also be in communication with controller 985, alone or in combination with detector 980. Visual indicator 995 may visually display information related to the relative position of objective lens 910. In one example, visual indicator 995 displays information related to the relative position of objective lens 910 with respect to dichroic element 940. In another example, visual indicator 995 displays information related to the relative position of objective lens 910 with respect to desired plane of focus 960. This information may be utilized by a user of system 900 to manually focus objective lens 910 to desired plane of focus 960.

Figure 10:
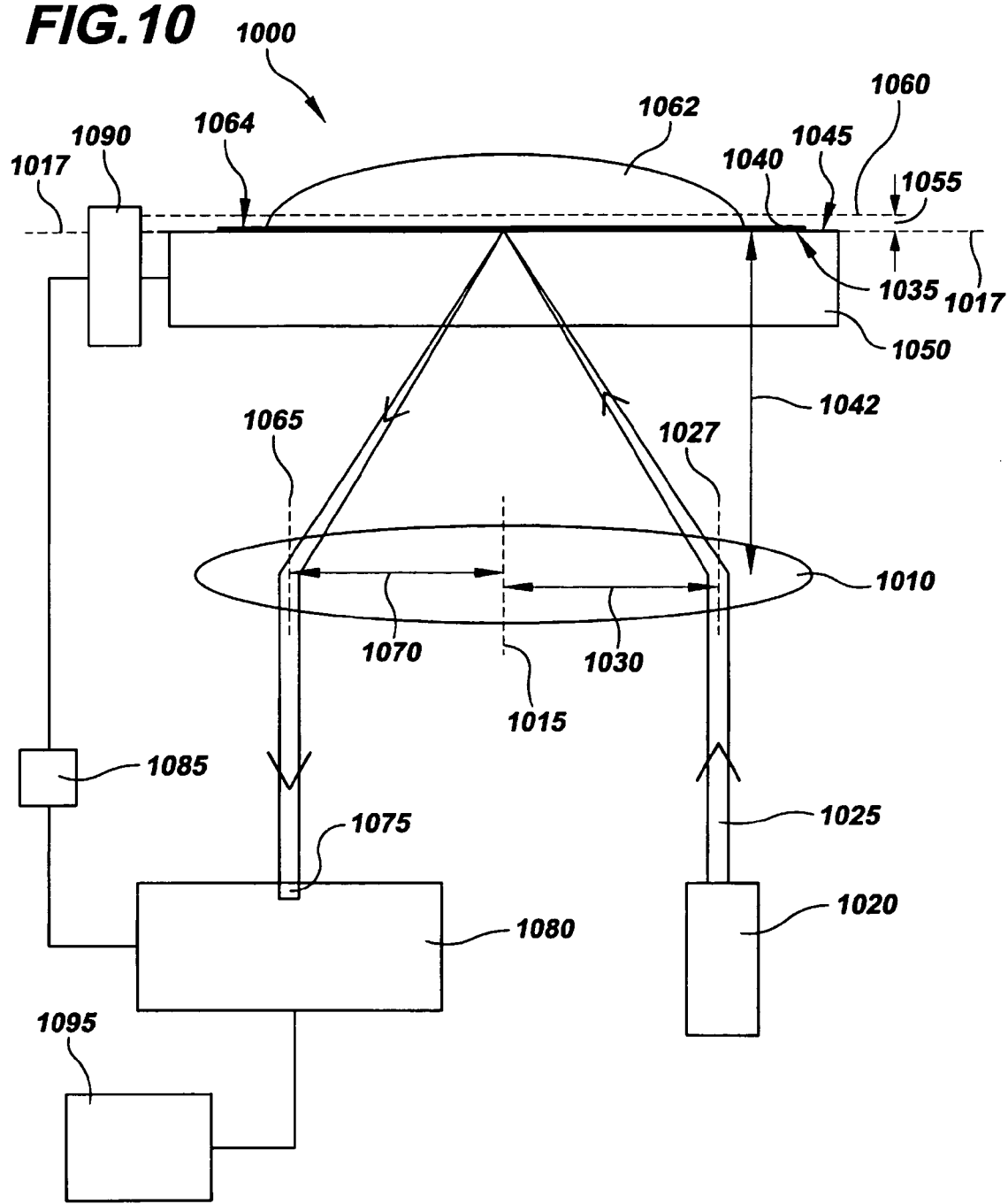
FIG. 10 shows a schematic drawing of an additional example of a system according to the present invention.

FIG. 10 illustrates yet another exemplary system 1000 according to the present invention. System 1000 includes an objective lens 1010 having a center axis 1015 and image plane 1017. An energy source 1020 is configured to deliver an energy 1025 to a first location 1027 of objective lens 1010 that is radially spaced from center axis 1015 at a first distance 1030. Energy 1025 transmits through objective lens 1010 and reflects from a first surface 1035 of a dichroic element 1040. Objective lens 1010 is shown spaced a distance 1042 from first surface 1035. Dichroic element 1040 is positioned on a first surface 1045 of a sample slide 1050. Dichroic element 1040 is positioned at a known distance 1055 from a desired plane of focus 1060. Desired plane of focus 1060 transects a sample 1062 positioned on a second surface 1064 of dichroic element 1040 that is opposite sample slide 1050. The energy 1025 reflected from surface 1035 passes back through objective lens 1010 at a second location 1065 that is radially spaced from center axis 1015 at a second distance 1070. Energy 1025 that passes through objective lens 1010 at second location 1065 is incident at a position 1075 of a detector 1080. The location of position 1075 on detector 1080 is related to the relative position of objective lens 1010 with respect to dichroic element 1040 and, thus, is related to second distance 1070 relative to first distance 1030. Detector 1080 is in communication with a controller 1085. Controller 1085 may process information reflecting first distance 1030 relative to second distance 1070 to determine the position of objective lens 1010 with respect to dichroic element 1040. Controller 1075 is in communication with a position modification device 1090 that is in direct or indirect mechanical communication with sample slide 1050 for changing a position of sample slide 1050. Indirect mechanical communication may be brought about by mechanical connection of position modification device 1090 with a sample stage. Controller 1085 may then utilize the position information with known distance 1055 to direct position modification device 1090 to modify the position of sample slide 1050. System 1000 may also include an optional visual indicator 1095, shown here in direct communication with detector 1080. Visual indicator 1095 may also be in communication with controller 1075, alone or in combination with detector 1080. Visual indicator 1095 may visually display information related to the relative position of objective lens 1010. In one example, visual indicator 1095 displays information related to the relative position of objective lens 1010 with respect to dichroic element 1040. In another example, visual indicator 1095 displays information related to the relative position of objective lens 1010 with respect to desired plane of focus 1060.

Figure 11:
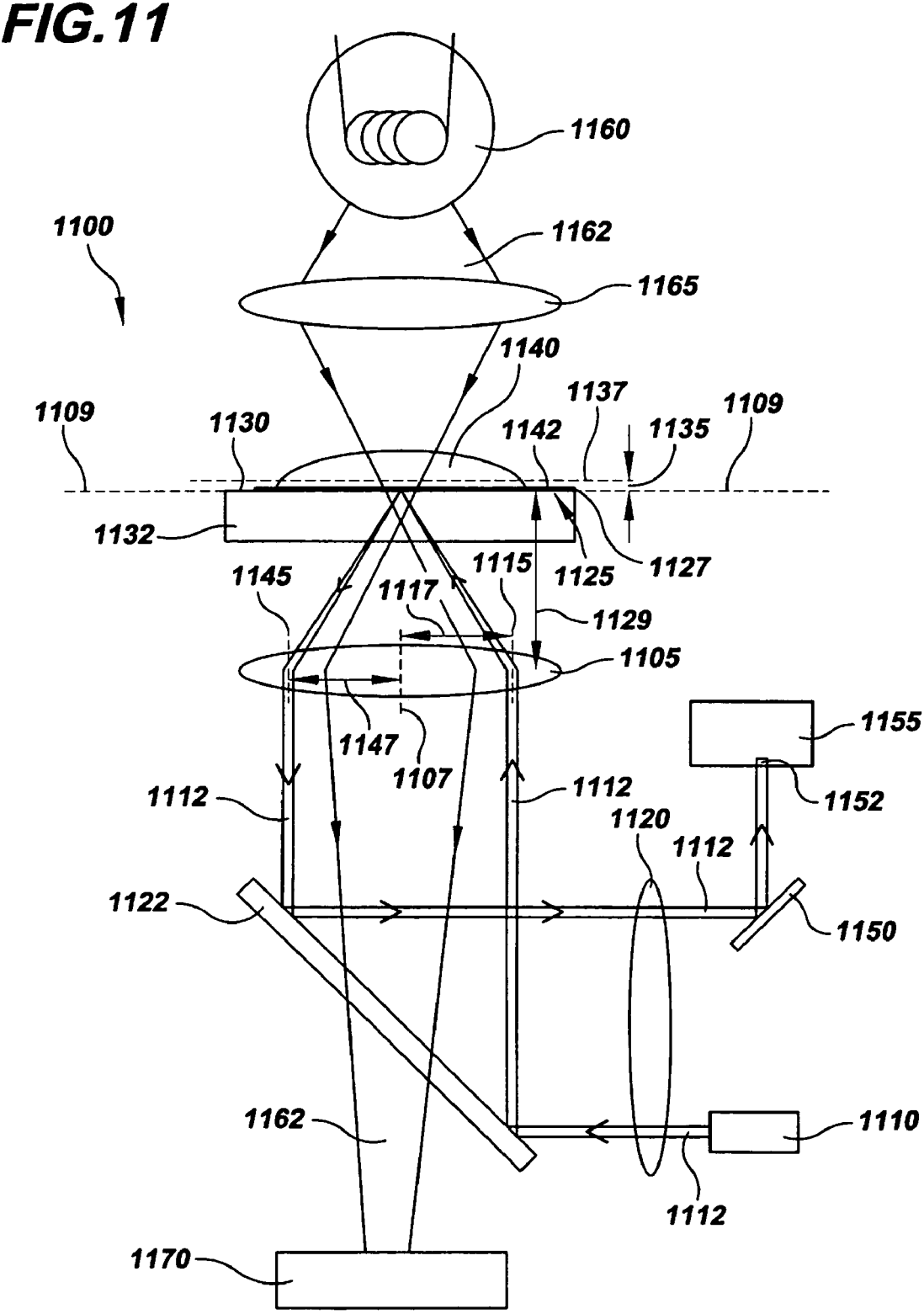
FIG. 11 shows a schematic drawing of yet an additional example of a system according to the present invention.

FIG. 11 shows an example of the use of an exemplary embodiment of the present invention in a microscopy application. System 1100 includes an objective lens 1105 having a center axis 1107 and image plane 1109. An energy source 1110 is configured to deliver an energy 1112 to a first location 1115 of objective lens 1105 that is radially spaced from center axis 1107 at a first distance 1117. In this example, energy 1112 first passes through a focusing lens 1120 and reflects from optical element 1122 to first location 1115. Energy 1112 transmits through objective lens 1105 and reflects from a first surface 1125 of a dichroic element 1127. Objective lens 1105 is shown spaced a distance 1129 from first surface 1125. Dichroic element 1127 is positioned on a first surface 1130 of a sample slide 1132. Dichroic element 1127 is positioned at a known distance 1135 from a desired plane of focus 1137. Desired plane of focus 1137 transects a sample 1140 positioned on a second surface 1142 of dichroic element 1127 that is opposite sample slide 1132. The energy 1112 reflected from surface 1125 passes back through objective lens 1105 at a second location 1145 that is radially spaced from center axis 1107 at a second distance 1147. Energy 1112 that passes through objective lens 1105 at second location 1145 is directed by optical element 1122 to focusing lens 1120 to optical element 1150 that directs energy 1112 at a position 1152 of a detector 1155. The location of position 1152 on detector 1155 is related to the relative position of objective lens 1105 with respect to dichroic element 1127 and, thus, is related to second distance 1147 relative to first distance 1117. This information may be used to focus objective lens 1105 at desired plane of focus 1137.

An imaging source 1160 provides a second energy 1162 of a second wavelength that can pass through dichroic element 1127 to a focusing lens 1165. Second energy 1162 then is incident at sample 1140 and passes through dichroic element 1127. Second energy 1162 then passes through objective lens 1105 and to optical element 1122. Optical element 1122 is dichroic in nature reflecting energy 1112 and allowing to second energy 1162 to pass to an imaging element 1170.

Various optical elements may be used to manipulate and/or direct energy prior to incidence at an objective lens and after reflecting back through an objective lens. These optical elements are optional and will depend on the application of the present invention. For example, different optical elements would be required for TIR microscopy as compared with non-TIR microscopy applications. Example optical elements include, but are not limited to, a mirror, a dichroic optical element, a focusing lens, a prism, and any combinations thereof.

A focusing lens may be used to modify an energy before or after passing through an objective lens. Typical laser output can have a particular diameter as it leaves its source (e.g., diameter of about 0.5 millimeter (mm) to about 1 mm). This diameter may increase the further the beam travels from the energy source. Some applications, such as TIR, may benefit from a beam of energy entering an objective lens at a smaller and/or known diameter (e.g., about 100 micrometers (μm) to about 200 μm). Additionally, in certain applications passing the reflected energy beam through a focusing lens prior to being incident at a detector allows for altering a divergent beam to a collimating beam.

An imaging element, such as imaging element 1170, may be any system that allows a user to perceive the image of interest. The imaging element can be electronic, mechanical, optical, or any combinations thereof. Examples of suitable imaging elements include, but are not limited to, a lens, a CCD, microscope, a camera, a particle detector, a microoptic biological screening systems, and any combinations thereof. One of ordinary skill in the art would be familiar with various imaging elements for use in microscopy and other applications.

The present invention does not require an image to determine proper focus. Even in the most simple configuration, (i.e., no electronics), the systems and methods of the present disclosure allow a user to reference an objective lens to a desired plane of focus that is a known distance from a dichroic element. Manual and/or automatic focus is then achievable. In more advanced systems, continuous high speed focus feedback is possible. An imaging energy is not required to make the objective lens reference. Thus, there is no need to interrupt digital image acquisition for focus feedback corrections to compensate for any drift in focus. Since no image is required, it is possible to maintain proper focus while simultaneously changing the fluid in a sample. This can allow numerous types of dynamic experiments in biology, chemistry, and physics. Microfluidics in microscopy is another application among a host of possibilities that require close focus control.

Further, the system and method of the present disclosure uses an element that is at a predetermined distance from the desired plane of focus as the reference point for focusing an objective lens. This is important in that whenever a sample is translated in the X-Y planes, there is Z axis error between the sample and the objective lens which affects the focus. Z axis errors also arise due to thermo-mechanical drift of the stage and other microscope components. Drift as little as, for example, 100 nanometers (nm) can be easily distinguished in a high magnification system as focus error. Referencing the dichroic element according to the present invention provides compensation for Z axis errors.

Another benefit that arises from the use of a dichroic element, such as dichroic element 140, includes the ability to reflect one or more wavelengths of energy more efficiently for use in referencing the position of the objective lens to a desired plane of focus, such as desired plane of focus 150. Reflection off of a plane glass surface, or other conventional sample substrate, allows typical energy beams, such as an IR laser beam, to only reflect a partial amount of each wavelength of energy that is incident at the glass surface. Thus, only a portion of the intensity of the energy could be reflected to a detector, while a portion (possibly, a substantial portion) of the energy of that wavelength is allowed to pass through the sample substrate to the sample. Depending on the wavelength of energy used for referencing the objective lens, this passed-through energy could be detrimental to a sample. Reducing energy exposure to a sample has important implications when working with certain fluorescent and biological preparations, particularly in long time lapse applications where focus drift are a long standing problem. Additionally, either the energy incident at the glass surface would need to be of higher intensity or the detector would need to be more sensitive than in a situation where the reflected light were of full intensity. The present invention uses a dichroic element, such as dichroic element 140, that can be selected to allow desired imaging wavelengths to safely pass to a sample, while more efficiently reflecting a greater intensity of an energy of a particular wavelength used for referencing the objective. This greater signal would allow higher resolution focus detection while preserving efficient light transmission for imaging.

Additionally, glass alone will only reflect a certain range of wavelengths incident at particular angles. Today, microscopy and imaging has ever increasing demands for using multiple light paths and various selected wavelengths. A dichroic element according to the present invention allows more flexibility in selecting wavelengths of light that can pass and be reflected at a wider range of angles. A dichroic element can also be more selective of which wavelengths are allowed to pass and reflect than would be available without such an element. A non-transparent surface, such as a surface of a semiconductor, does not allow any energy to pass through, thereby restricting many imaging configurations. TIR reflection requires TIR conditions at an interface between two materials and high numerical aperture objective lenses. This significantly restricts the use of this type of reflection and requires the presence of an evanescent field, which may not be desirable in all applications. A dichroic element can be used in TIR and non-TIR applications to reference an objective to a desired plane of focus.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A system for referencing an objective lens to a desired plane of focus, said system comprising:

(a) an objective lens having a center axis;

(b) an energy source for directing a first energy of a first wavelength so as to intercept said objective lens at a first location that is radially spaced at a second distance from said center axis, said first energy being directed by said objective lens to a first surface of a dichroic element positioned a predetermined first distance from the desired plane of focus, said first energy ten reflecting off said first surface and transmitting through said objective lens at a second location that is different from said first location at a third distance from said center axis; and (c) a detector operatively configured to detect said first energy after being transmitted through said objective lens at said second location, said detector providing information relating to said second distance relative to said first distance.

2. A system according to claim 1, wherein said first energy source is selected from the group consisting of a laser beam, arc lamp, tungsten lamp, halogen lamp, and light emitting diode.

3. A system according to claim 1, wherein said dichroic element is a dichroic layer on a sample slide.

4. A system according to claim 3, wherein said dichroic layer is on a side of said sample slide intended for placement of a sample.

5. A system according to claim 1, wherein said dichroic element is a thin film deposited on a surface of a sample slide.

6. A system according to claim 1, further comprising one or more optical elements for directing said first energy to said detector.

7. A system according to claim 1, further comprising a controller in communication with said detector, said controller being for processing said information with respect to said first distance to reference said objective lens to the desired plane of focus.

8. A system according to claim 7, further comprising a position modification device in communication with said controller, said position modification device for changing the relative position of said objective lens to the desired plane of focus as a result of said processing.

9. A system according to claim 8, wherein said position modification device changes the position of said objective lens.

10. A system according to claim 8, wherein said system further comprises a sample platform, further wherein said position modification device changes the position of a sample platform.

11. A system according to claim 8, wherein said position modification device is operatively configured to automatically focus said objective lens to the desired plane of focus.

12. A system according to claim 8, wherein said position modification device is operatively configured to allow manual focus of said objective lens to the desired plane of focus.

13. A microscope comprising:
(a) an objective lens having a center axis;
(b) an energy source for directing a first energy of a first wavelength so as to intercept said objective lens at a first location that is radially spaced at a second distance from said center axis, said first energy being directed by said objective lens to a first surface of a dichroic element positioned a predetermined first distance from the desired plane of focus, said first energy then reflecting off said first surface and transmitting through said objective lens at a second location that is different from said first location at a third distance from said center axis; and
(c) a detector operatively configured to detect said first energy after being transmitted through said objective lens at said second location, said detector providing information relating to said second distance relative to said first distance.

14. A system for referencing an objective lens to a desired plane of focus, the system comprising:
(a) an objective lens having a center axis;
(b) a dichroic element positioned a predetermined first distance from the desired plane of focus;
(c) an energy source for directing a first energy of a first wavelength so as to intercept said objective lens at a first location that is radially spaced at a second distance from said center axis, said first energy being directed by said objective lens to a first surface of said dichroic element, said first energy then reflecting off said first surface and transmitting through said objective lens at a second location that is different from said first location at a third distance from said center axis; and
(d) a detector operatively configured to detect said first energy after being transmitted through said objective lens at said second location, said detector providing information relating to said second distance relative to said first distance.

15. A system according to claim 14, wherein said dichroic element is a dichroic layer on a sample slide.

16. A system according to claim 15, wherein said dichroic layer is on a side of said sample slide intended for placement of a sample.

17. A system according to claim 14, wherein said dichroic element is a thin film deposited on a surface of said sample slide.

18. A system according to claim 14, further comprising a controller in communication with said detector, said controller being for processing said information with respect to said first distance to reference said objective lens to the desired plane of focus.

19. A system according to claim 18, further comprising a position modification device in communication with said controller, said focusing element for changing the relative position of said objective lens to the desired plane of focus as a result of said processing.

20. A microscope comprising:
(a) an objective lens having a center axis;
(b) a dichroic element positioned a predetermined first distance from the desired plane of focus;
(c) an energy source for directing a first energy of a first wavelength so as to intercept said objective lens at a first location that is radially spaced at a second distance from said center axis, said first energy being directed by said objective lens to a first surface of said dichroic element, said first energy then reflecting off said first surface and transmitting through said objective lens at a second location that is different from said first location at a third distance from said center axis; and
(d) a detector operatively configured to detect said first energy after being transmitted through said objective lens at said second location, said detector providing information relating to said second distance relative to said first distance.

21. A method of focusing an imaging device, the method comprising:
(a) providing a dichroic element having a first side and a second side;
(b) providing an objective lens having a center axis, a first side, and a second side spaced from said first side, wherein said first side of said objective lens confronts said first side of said dichroic element;
(c) passing a first energy through said objective lens at a first distance from said center axis such that said first energy reflects off of said dichroic element and back through said objective lens at a second distance from said center axis;
(d) detecting a relationship between said first distance and said second distance;
(e) using said relationship to focus said objective lens.

22. A method according to claim 21, wherein said objective lens is focused on a desired plane of focus coincident with said dichroic element.

23. A method according to claim 21, wherein said objective lens is focused on a desired plane of focus at a known distance from said dichroic element.

24. A method according to claim 21, further comprising imaging a sample.

25. A method according to claim 24, wherein said objective lens is focused on a desired plane of focus within said sample at a known distance from said dichroic element.

26. A system for referencing an objective lens to a desired plane of focus, the system comprising:
   (a) an objective lens having a center axis;
   (b) a dichroic element positioned a predetermined first distance from the desired plane of focus;
   (c) an energy source for directing a first energy of a first wavelength so as to intercept said objective lens at a first location that is radially spaced at a second distance from said center axis, said first energy being directed by said objective lens to a first surface of said dichroic element; and
   (d) a detector operatively configured to detect a relative position of said first energy that is reflected from said first surface as a second distance between said objective lens and said dichroic element is varied and provide information related to said relative position for referencing said objective lens to the desired plane of focus.

* * * * *